United States Patent [19]
Quraishi

[11] Patent Number: 5,548,512
[45] Date of Patent: Aug. 20, 1996

[54] AUTONOMOUS NAVIGATION APPARATUS WITH NEURAL NETWORK FOR A MOBILE VEHICLE

[75] Inventor: Naveed Quraishi, Houston, Tex.

[73] Assignee: The United States of America as represented by the Administrator of the National Aeronautics and Space Administration, Washington, D.C.

[21] Appl. No.: 317,443

[22] Filed: Oct. 4, 1994

[51] Int. Cl.⁶ .................................................. G06F 165/00
[52] U.S. Cl. ...................... 364/424.02; 395/905; 180/167
[58] Field of Search ............................... 364/424.02, 460, 364/434, 559; 180/167, 168, 169; 318/587; 395/94, 905, 86, 23, 24, 93

[56] References Cited

U.S. PATENT DOCUMENTS

| | | | |
|---|---|---|---|
| 4,884,216 | 11/1989 | Kuperstein | 364/513 |
| 5,063,492 | 11/1991 | Yoda et al. | 364/167.01 |
| 5,124,918 | 6/1992 | Beer et al. | 364/424.02 |
| 5,165,064 | 11/1992 | Mattaboni | 356/152 |
| 5,172,253 | 12/1992 | Lynne | 395/22 |
| 5,214,745 | 5/1993 | Sutherland | 395/22 |
| 5,253,329 | 10/1993 | Villarreal et al. | 395/24 |
| 5,276,770 | 1/1994 | Castelaz | 395/23 |
| 5,321,614 | 6/1994 | Ashworth | 364/424.02 |
| 5,377,106 | 12/1994 | Drunk et al. | 364/424.02 |

FOREIGN PATENT DOCUMENTS

| | | |
|---|---|---|
| 4285293 | 10/1992 | Japan . |
| 4336303 | 11/1992 | Japan . |

OTHER PUBLICATIONS

Rigobert Opitz; *Neural Network Applications for Autonomous Mobile Robots*; Jul. 1990; International Neural Network Conference, INNC 90 Paris; pp. 225–228.

Primary Examiner—Michael Zanelli
Attorney, Agent, or Firm—Hardie R. Barr

[57] ABSTRACT

An autonomous navigation system for a mobile vehicle arranged to move within an environment includes a plurality of sensors arranged on the vehicle and at least one neural network including an input layer coupled to the sensors, a hidden layer coupled to the input layer, and an output layer coupled to the hidden layer. The neural network produces output signals representing respective positions of the vehicle, such as the X coordinate, the Y coordinate, and the angular orientation of the vehicle. A plurality of patch locations within the environment are used to train the neural networks to produce the correct outputs in response to the distances sensed.

22 Claims, 6 Drawing Sheets

○ = TRAINING POINT   ◉ = TEST POINT

AUTONOMOUS NAVIGATION APPARATUS WITH NEURAL NETWORK FOR A MOBILE VEHICLE

ORIGIN OF THE INVENTION

The invention described herein was made by an employee the United States Government and may be manufactured and used by or for the Government of the United States of America for governmental purposes without the payment of any royalties thereon or therefore.

BACKGROUND OF THE INVENTION

The present invention relates to autonomous navigation apparatus for a mobile vehicle, such as a robot, truck, automobile, boat, airplane or space ship, which vehicle is arranged to move in a forward (or rearward) direction within an environment that is delimited, at least in part, by a boundary, such as a wall, curb, ocean buoys or the like.

For example, in the case of a robot, which may be designed to deliver mail within an office building, move boxes in a warehouse or perform other tasks, the robot moves in a forward and rearward direction within the boundaries set by walls, fixtures, furniture and the like.

In the case of a truck, this vehicle may be required to move either forward or backward on a ramp, delimited on one side by a loading platform, and then to back toward the loading platform and to stop just prior to contact.

A truck, or an automobile, is also required to drive on a road which is delimited on the left side by a painted center line or barrier strip and on the right side by a painted line, curb, wall or the like.

In the case of a boat, this mobile vehicle is required to stay within water traffic lanes and, upon approach to a harbor, its movement is delimited by the harbor shore line defined by docks, cement abutments and the like.

In the case of an airplane, this "vehicle" is required to move about or taxi on the ground within an area delimited by the edges of runways, taxiways and ramps, and is even limited in its movements while in the air.

While most applications of the present invention concern three degrees of freedom—that is, movement in a horizontal plane defined by orthogonal coordinates such as Cartesian (X Y) coordinates and yaw (angle of rotation about a third (e.g., Z) orthogonal coordinate)—the invention is also applicable to an airplane or a space ship which operates with six degrees of freedom—that is, three dimensional space coordinates plus three motion coordinates (roll, pitch and yaw). For example, the invention may be applied to a small, cylindrical robot arranged to move in a gravity-free environment within an enclosed space defined by the walls of a large space ship. This robot must be controlled to move from one desired position to another within the three dimensional space and to orient itself at each position.

The invention will be described herein with reference to a robot designed to move in two dimensions along hallways within a building and to rotate about its vertical axis; however, it will be readily apparent that the invention is applicable also to other types of mobile vehicles as noted above.

Mobile robots used in the delivery of mail, for example, have relied for navigation on devices external to the robot, such as active beacons and/or bar code targets, for determining the instantaneous location of the robot and maintaining calibration. In addition to using these external devices, the wheels of some mobile robots have been equipped with high precision wheel odometers to keep track of movement from one position to another.

The disadvantages associated with these navigation systems may be categorized as both qualitative and quantitative. Systems which use external bar code targets require a large number of these targets in the enclosed environment, each of which must be precisely aligned in height, etc. for interrogation by the target readers located on the robot. Position accuracy provided by systems based on active beacons is inadequate for some applications. High precision wheel odometry systems are expensive to design, manufacture and maintain.

SUMMARY OF THE INVENTION

It is a principal object of the present invention to provide an autonomous navigation system for a mobile vehicle which overcomes the disadvantages of the prior known systems noted above.

It is a further object of the present invention to provide an autonomous navigation system for a mobile vehicle that can maintain calibration as the vehicle moves about within an environment that is delimited, at least in part, by a boundary.

These objects, as well as other objects which will become apparent from the discussion that follows, are achieved, in accordance with the present invention, by providing apparatus which includes:

(a) a plurality of sensors arranged on the vehicle and adapted to determine the distance from the vehicle to the environmental boundary, with each sensor being operative to determine the distance in a unique angular direction, substantially perpendicular to the central vertical axis of the vehicle;

(b) a first neural network comprising an input layer coupled to the sensors, a hidden layer coupled to the input layer and an output layer coupled to the hidden layer, for producing a first output representing a first identification of the position of the vehicle; and (c) a second neural network comprising an input layer coupled to the sensors, a hidden layer coupled to the input layer and an output layer coupled to the hidden layer, for producing a second output representing a second identification of the position of the vehicle.

Preferably, the first and second position identifications for the vehicle are first and second spacial coordinates, respectively. In a preferred embodiment, these coordinates are orthogonal and, in particular, are Cartesian coordinates of the position of the vehicle.

The first and second neural networks may be completely separate and independent, or they may overlap in whole or in part to form a combined neural network producing the first and second outputs. In the latter case, the network elements (nodes) of the first and second networks and at least two layers of these networks are associated with, and serve, both the first and second neural networks. It will be understood that, in this case, the network elements are combined to form a single neural network with plural outputs representing the first and second position identifications of the vehicle.

Also, it will be understood that the neural network(s) may have one or more hidden layers. A three layer neural network (i.e., a neural network with one hidden layer) is the minimum configuration for the present invention.

As used herein, the term "neural network" is intended to mean an actual or simulated (e.g., by computer program)

network comprised of numerous, independent, highly interconnected artificial neurons which simulate the functions of biological neurons. Such neural networks, particularly those known as "backpropagation neural networks" are disclosed, inter alia, in the U.S. Pat. No. 5,253,329.

In addition to sensors for determining the distance from the vehicle to a boundary of the environment, the apparatus may be provided with encoders which supply other parameters to the neural networks. For example, the encoders may determine and provide a signal representing the distance traveled by the vehicle. Such a parameter is preferably obtained from a wheel odometer.

According to a particular feature of one embodiment of the present invention, the apparatus includes a third neural network comprising an input layer coupled to the sensors, a hidden layer coupled to the input layer and an output layer coupled to the hidden layer, for producing a third output signal representing a third identification of the position of the vehicle. Advantageously, where the first and second position identifications are spacial coordinates, the third position identification is an angular coordinate representing the angular orientation of the vehicle within the spacial coordinate frame.

As described previously, the third neural network may be combined with the first and/or the second neural network to form a single neural network with plural outputs representing the first, second and third position identifications of the vehicle.

The present invention thus provides a mobile vehicle with a navigation system that can maintain calibration as the vehicle moves within an enclosed environment. The invention utilizes neural network technology to determine both Cartesian coordinate and angular orientation associated with the vehicle's position for specific regions within the enclosed environment. These specific regions are defined as "patches" which the vehicle learns with respect to position and angular orientation. Data provided by proximity sensors, such as ultrasonic range sensors, is used to determine the vehicle's position at each patch. Every position within each patch provides a unique, repeatable set of sensor readings the navigation system uses to "learn" the environment. The navigation system maintains calibration by recalibrating the vehicle's position each time the vehicle enters one of several patches in the environment.

The basis of this invention is a fully interconnected neural network with three or more layers. No external devices or high-precision wheel odometry is required. Neural networks are high-speed parallel processing electronic circuits modeled after the way in which neurons are connected in the human brain. These circuits have the ability to map (learn) the functional relationship between input and output data sets if such a functional relationship exists. Processing data in parallel via multiple neural networks, or a single neural network, can often simplify a problem.

Low precision wheel odometry may be used to determine the approximate location of the vehicle as it moves between the "patches" or regions where the system is recalibrated.

For the proposed application of this invention discussed hereinbelow, three on-board neural networks are used to determine the position and angular orientation of a mobile vehicle operating within an office building environment. One network generates the X coordinate, another network generates the Y coordinate, and a third network generates a Theta value associated with the vehicle's position within regions defined as "patches" in the building. Once regions within the vehicle's environment are defined to be recalibration patches, data from multiple ultrasonic range sensors located on the vehicle is taken for several locations within each patch. The data associated with these locations is defined as "training" data. Data provided by the multiple ultrasonic range sensors is provided to the three networks for processing. The neural networks thus map the functional relationship between the actual data collected for training and the desired X, Y and Theta values associated with the sensor readings. After the networks have been "trained" they can provide the Cartesian coordinates and angular orientation for any set of sensor readings taken within a recalibration patch. The robot's navigation system maintains calibration as it moves from patch to patch.

Alternative embodiments of this invention include any variety of applications where one or multiple neural networks can be used to map data from multiple sensors onboard a vehicle to a set of coordinates used by the vehicle for navigation and/or collision avoidance. The only requirement is that the environment be such that a neural network can be trained with the sensor data used to characterize the environment. This implies that there be a functional relationship between the sensor data and the coordinates. Once these conditions are met, the present invention can be implemented.

This invention offers advantages over prior vehicle navigation systems. The neural network based position recalibration system is a self-contained system that is on board the vehicle. The system is flexible and can easily adapt to new environments via training. By having the vehicle move through several recalibration patches in the environment, the vehicle's dependency on high fidelity odometry is greatly reduced, thus reducing the cost of the mobile base development and maintenance.

Unlike other mobile vehicle navigation systems, the present invention utilizes neural network technology to determine position and angular orientation in real time. The system does this without any extensive data or mathematical processing. The concept of using recalibration patches enables a system to "learn" the features associated with the enclosed environment of the vehicle. An important characteristic of the neural network is its ability to provide interpolation. Consequently, the network, once trained, can allow for some variation in the input data due to noise and still provide good performance.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1–9 of the drawings. Identical elements in the various figures are designated with the same reference numerals.

The present invention makes it possible to derive repeatable, accurate information relative to the position and orientation of a mobile vehicle using low-cost sensors (i.e., sonar, microwave, wheel odometry encoders and the like) that individually provide a variety of different, but not always accurate data about the environment. In the past, fully automated and autonomous navigation of mobile vehicles required either that the vehicles moved along a defined track or that the vehicles were controlled from wheel odometry data and other positional data which repeatedly corrected for slippage in the wheels that made the encoder data inaccurate. In either case, the power train design from the motor on down through the wheels had to be very tightly engineered and designed to ensure precise control and measurement. Furthermore, if moderately priced sensors were used to determine position, errors and variances in their performance data would result.

In order to obtain meaningful useable information from such distance sensors, it has been necessary to write extensive software routines. This software had to be written specifically to analyze all the varied sensor data and to correct all the inconsistencies. The software had to be repeatedly revised for nuances in each of the operating arenas to insure accuracy. As a consequence, the final system was complicated, unwieldy and expensive.

With the present invention, the approximate range (determined by sonar or infra-red signals) and distance travelled (determined by an encoder) are fed into one or more neural networks. These neural networks were previously "trained" to provide useful outputs identifying the position and orientation of the vehicle.

Neural networks are high-speed parallel processing electronic circuits modeled after the way in which neurons are connected in the human brain. These circuits have the ability to map (learn) the functional relationships between input and output data sets if such functional relationships exist. A detailed disclosure of neural networks, such as "backpropagation" networks, may be found in the U.S. Pat. No. 5,253,329, which disclosure is incorporated herein by reference.

Figure 1:
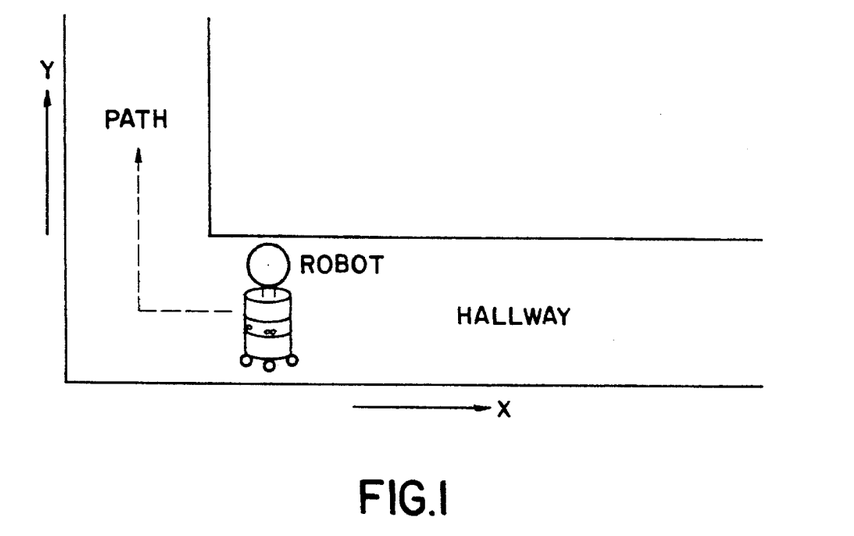
FIG. 1 is a plan view showing the path of a robot within the hallway of a building.

The present invention was actually constructed and tested in connection with a so-called "Courier Robot", that is, a robot designed to traverse the hallways of a building and deliver mail. FIG. 1 is a diagram showing the optimum path of a Courier Robot within a hallway. The location of the Robot within the hallway is definable at any time by Cartesian (X, Y) coordinates. Any other coordinate system may also be used, however, it is preferable that the coordinates be orthogonal.

Figure 2:
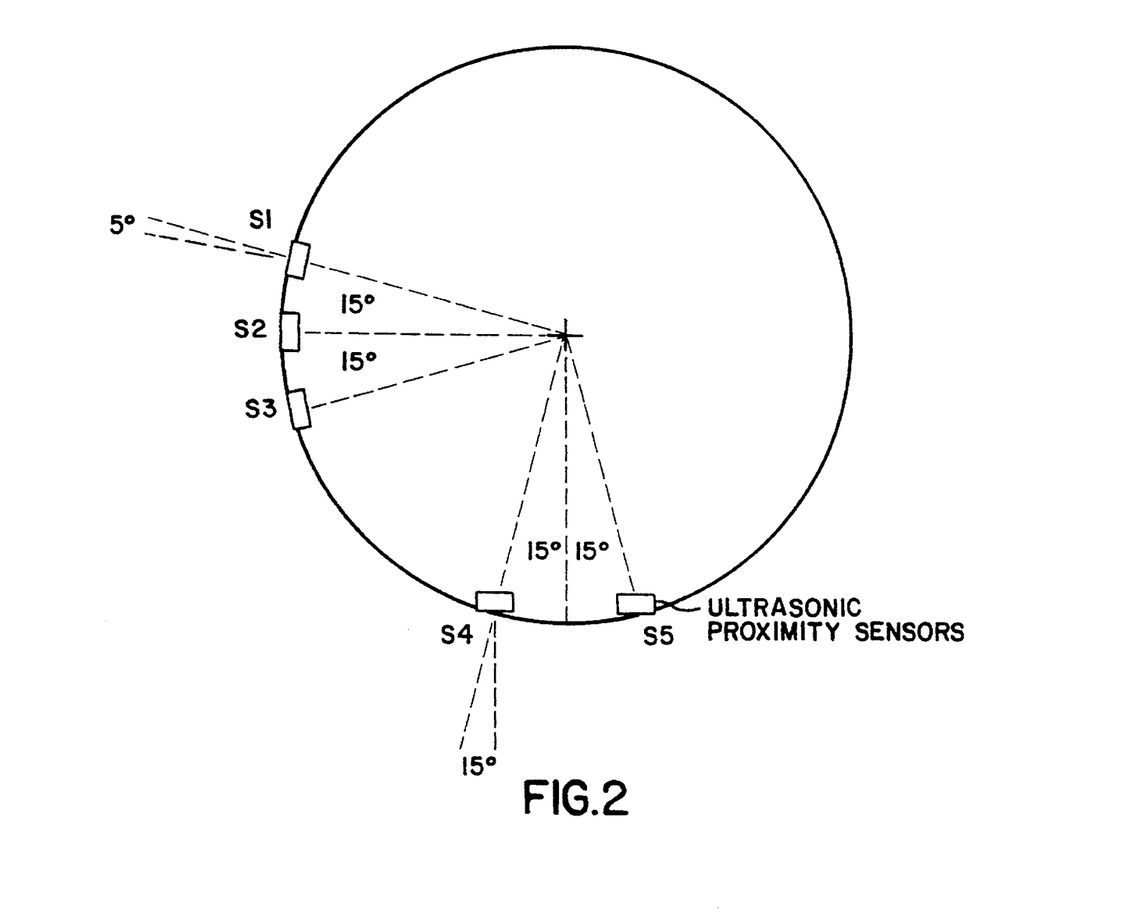
FIG. 2 is a representational diagram showing the position of ultrasonic proximity sensors mounted on a robot.

FIG. 2 shows the arrangement of range detecting sensors around the periphery of the Robot. In the present embodiment—that is, and on the Courier Robot actually constructed and tested—five sensors were used: three forward viewing sensors S1, S2 and S3 and two side viewing sensors S4 and S5. The center forward viewing sensor S2 was aimed directly forward, along the radial of the Robot. The other two forward viewing sensors S1 and S3 were aimed at a five degree angle with respect to the radial, giving a slight (plus or minus 10 degrees) width to the angle of "vision".

The side viewing sensors S4 and S5 was aimed in a direction parallel to the radial which was perpendicular to the forward radial of sensor S2. Consequently, the sensors S4 and S5 were aimed directly toward a side wall of a hallway.

Figure 3A:
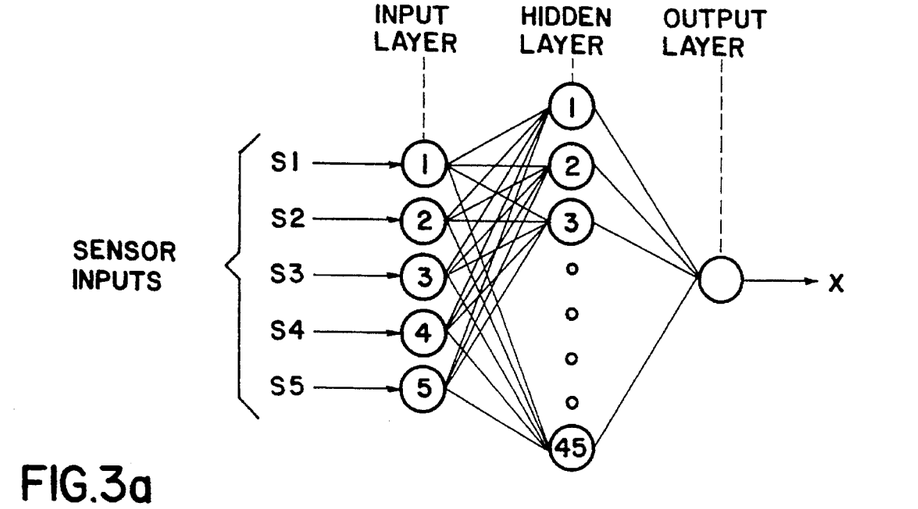
FIGS. 3A, 3B and 3C are representational diagrams of three neural networks which receive sensor inputs and produce an output signal representing the X coordinate, Y coordinate and Theta orientation of the robot, respectively.
Figure 3B:
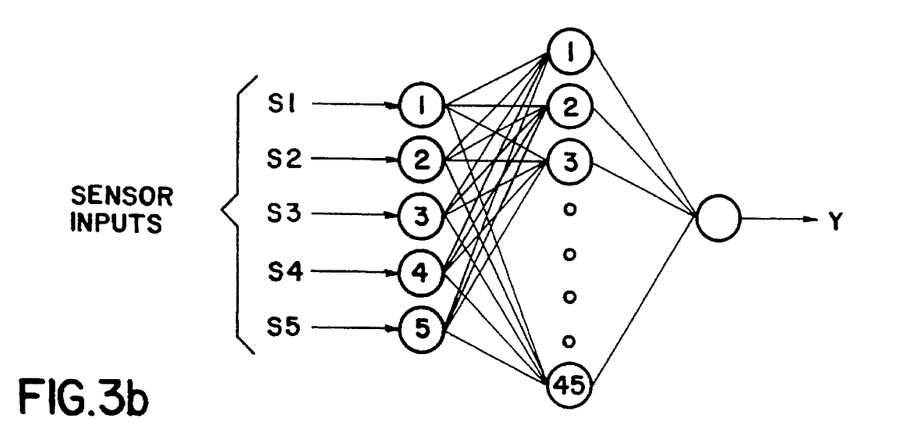
Figure 3C:
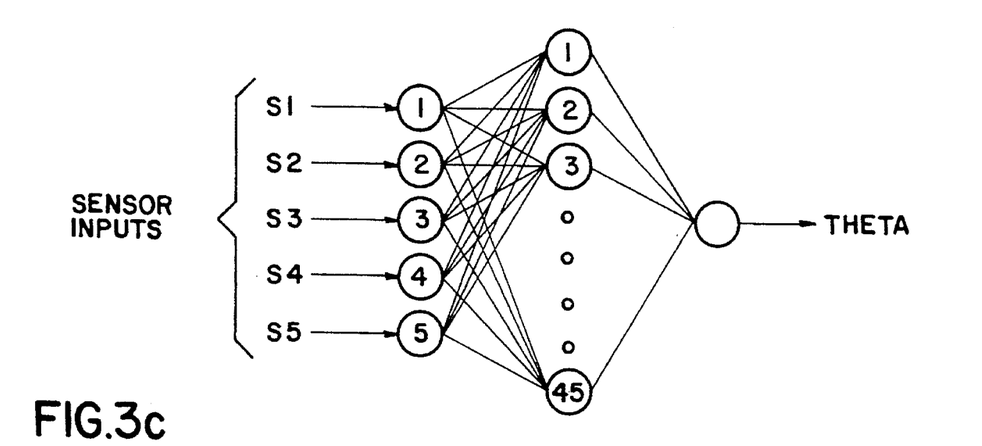

To date, one navigation system prototype has been developed for the "Courier Robot". It was comprised of three independent three-layer backpropagation neural networks. Each network was fully interconnected with five input layer nodes, forty-five hidden layer nodes, and a single output layer node. The system architecture is shown in FIG. 3. The system required no device external to the robot.

The three on-board neural networks were used to determine both the Cartesian coordinates (position) and angular orientation of the Courier Robot as a function of range data generated from on-board proximity sensors as it traveled within an office building. A neural network simulator (i.e., a software controlled microprocessor) was used instead of actual circuitry to train and operate the Courier Robot navigation system. Such neural network simulators are available commercially, for example, from NASA, Johnson Space Center, Houston, Tex. One network generated the X coordinate, another network generated the Y coordinate, and the third network generated a Theta value associated with Courier Robot's position at designated regions in the building defined as "patches". Each "patch" was a predefined area in the building, usually located in a hallway.

In practice, the Courier Robot learned to recognize its own position and angular orientation at one patch in a building. The range data was provided by the five on-board ultrasonic sensors (FIG. 2), collected sequentially for several locations within each patch.

The data associated with these locations provided the "training" data for the three neural networks. For each location within the patch, sensor readings were taken as the Courier Robot was rotated in a clockwise and counterclockwise direction. By implication, the Courier Robot can thus be "trained" to determine its position and angular orientation within a patch for each patch in the building. As the Courier Robot travels from patch to patch it can perform wheel odometry recalibration, as necessary, in order to ensure that low-level commands to the on-board motor control circuitry are able to maneuver the Robot into the next patch of the planned path.

Figure 6:
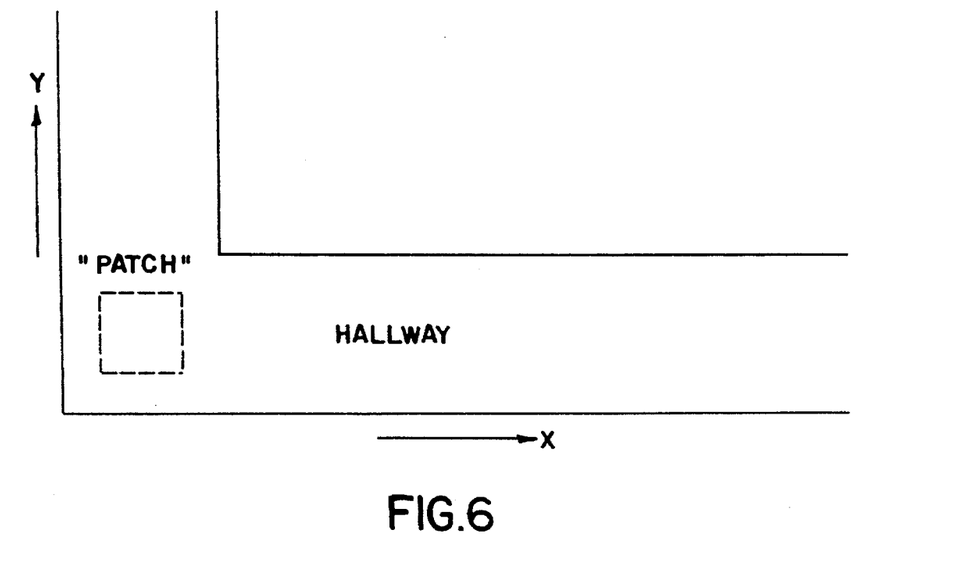
FIG. 6 is a plan view, similar to FIG. 1, showing the location of a training patch.
Figure 7:
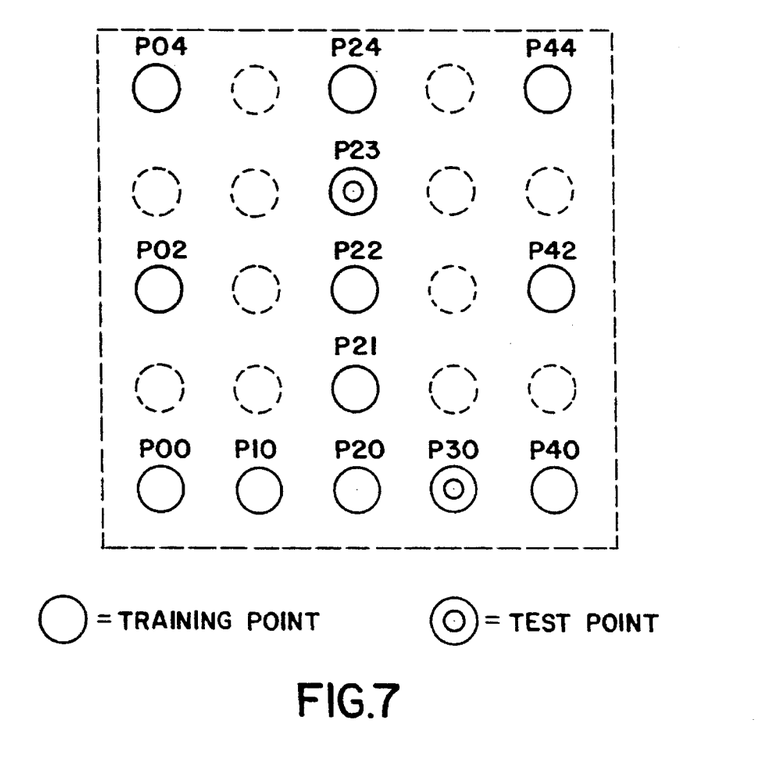
FIG. 7 is a plan view showing the detailed points within a training patch.

The Courier Robot's navigation system was thus constructed and tested using a single recalibration patch in the hallway of an office building as shown in FIG. 6. FIG. 7 depicts the patch in detail and shows the positions within the patch where sensor data was collected. At each location, sensor data was collected as the Courier Robot was rotated plus and minus 10 degrees in 1 degree increments. The input and output range data used to train all three networks independently was determined in millimeters. The X and Y coordinate networks were successfully trained to maximum errors of 14 mm and 24 mm, respectively, using the sensor readings. The trained networks were then tested using sensor data not used during the training process to measure the system performance. The trained networks produced values for X and Y with RMS error values of only 6.47 mm and 13.81 mm, respectively.

Figure 4:
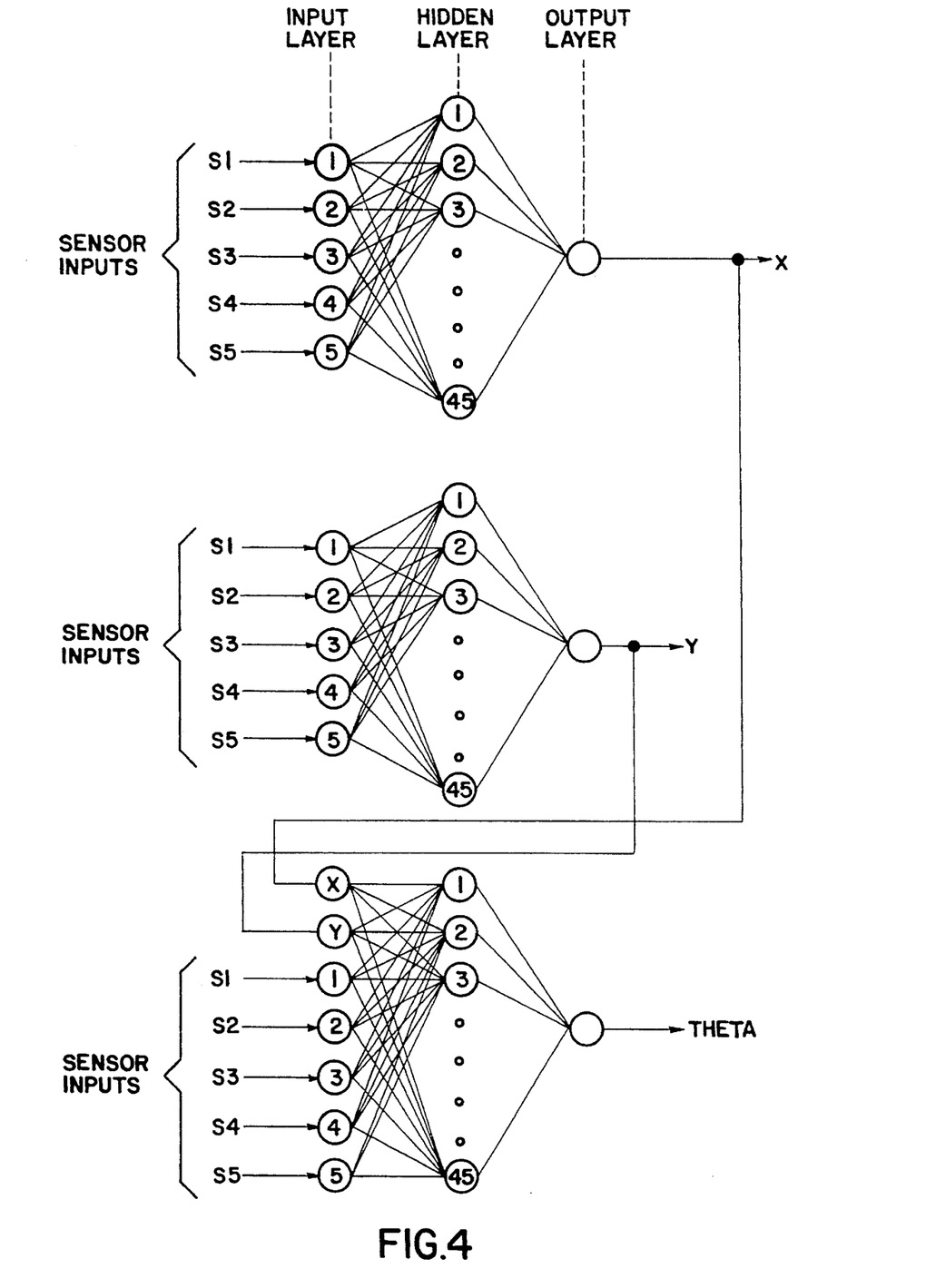
FIG. 4 is a representational diagram of three neural networks, similar to those of FIGS. 3A, 3B and 3C, wherein the outputs of two networks are supplied as inputs to a third network.

Due to the inconsistencies in sensor data generated by the particular sensors used on the Courier Robot, the network for determining the Theta value associated with the Courier Robot's location within the patch could not be trained using only the five sensor readings. Alternative network architectures and input data sets were then investigated to solve the problem. One approach that was tested used a three-layer network with seven input layer nodes. The input data consisted of the five range sensor outputs and both the X and Y coordinates generated by the other two networks. The architecture for this system is shown in FIG. 4. The number of positions within the patch used for the network training was reduced to a certain number of positions along a line. This approach produced Theta values with RMS error of only 0.414 degrees using test positions within the patch.

Figures 8, 9:
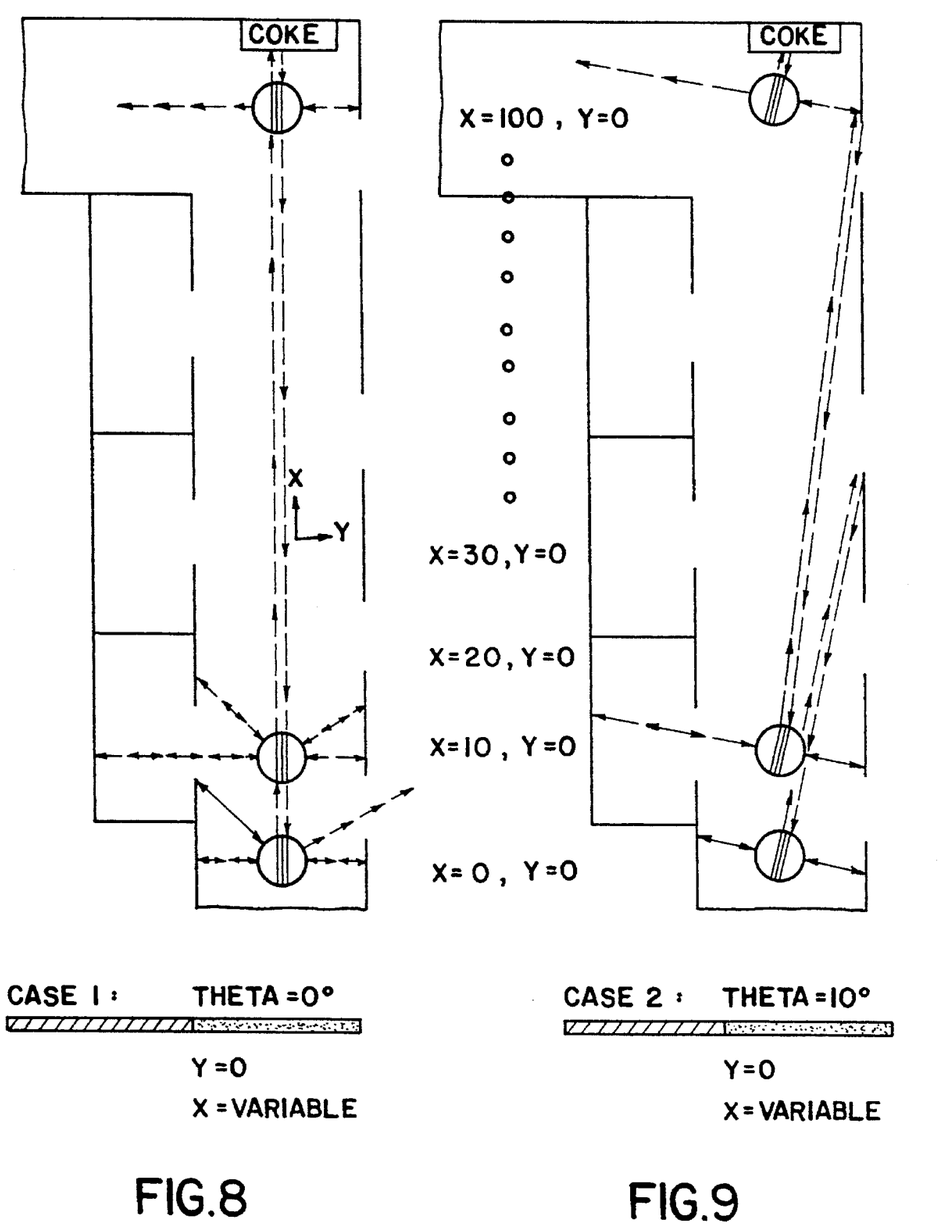
FIG. 8 is a plan view illustrating the movement of a robot within a building hallway.
FIG. 9 is a plan view, similar to FIG. 8, illustrating the movement of a robot within a building hallway.

FIGS. 8 and 9 show how the Courier Robot could be trained to learn a path using the present invention. This learning process could be easily automated, where the Robot would be given its coordinates and would automatically step through the learning process. For example, the Robot being trained may have the following input devices:

1. Two encoders one on each drive wheel;
2. A range detection device (long broken arrows going down the length of the hall); and
3. A sonar device shooting out radially towards walls (shorter broken arrows).

"Case 1", shown in FIG. 8, is for the device facing dead straight down the hallway and "Case 2", shown in FIG. 9, is for the device being trained at the same location but now rotated 10 degrees.

It is not important that the Robot recognize every location in the hallway, although this would be optimum and is theoretically possible. The bare minimum would be that it be able to recognize two areas (i.e., each corner at the end of the hallways) in order to get a fix on its location. These areas the Robot has learned to recognize are termed "patches". As long as the Robot can reach a patch, it can get a fix on its position at that time. Once the Robot knows its exact location, the locations of the two patches and their relationship to each other, it can maneuver in the region between. Basically it has then acquired a built-in recalibration device.

The Robot would initially be located at position X=0, Y=0, Theta angle=0. The neural network may then be fed these sensor signals and may be trained to recognize this unique combination of signals as being equal to x=0, y=0, Theta=0.

The Robot may then be rotated clockwise 10 degrees and trained to recognize the new unique set of sensor signals as being equal to x=0, y=0, Theta=+10 degrees (Case 2 in FIG. 9). This may be repeated for minus 10 degrees and then for plus and minus 20 degrees, and so forth.

The Robot may then be moved in the X direction one foot and trained to recognize the new combination of sensor inputs for that position as being X=10, Y=0, Theta=0 (Case 1 in FIG. 8).

This may be repeated again for minus 10 degrees and then for plus and minus 20 degrees, and so on.

In this manner, the neural network may correlate every one of the unique combinations of sensor signals (range, sonar, encoder) to an X, Y, location and an orientation Theta.

As long as enough of a combination of sensor inputs are provided for each location and the appropriate three layer network is used (with enough neurons in each layer to match the complexity of the problem), the neural network would be able to solve this otherwise extremely difficult problem.

The requirements are that (a) enough samples be taken to facilitate training, and (b) enough sensors be provided to give a combination of data for each location; that is, at a minimum:

1. Three to eight sonar sensors; and
2. One long range microwave range finder (to give data reflective of distance to the end of the hall).

Figure 5:
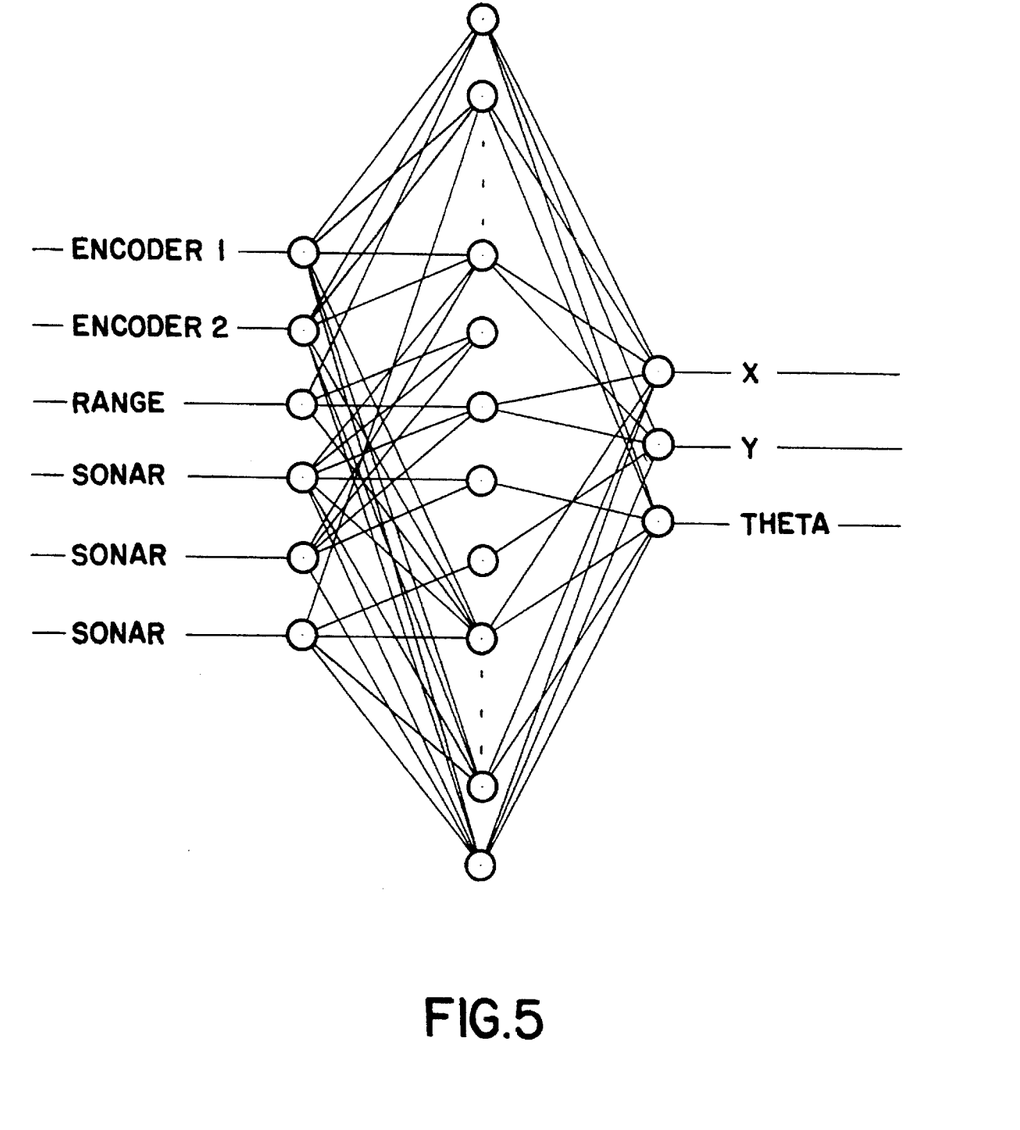
FIG. 5 is a representational diagram of a combined neural network having three output nodes for producing signals representing the X coordinate, Y coordinate and Theta orientation of a robot, respectively.

In addition, it is preferable to provide the Robot with an encoder for at least one wheel. FIG. 5 depicts a combined neural network having two encoder input nodes, one range input node, and three sonar input nodes for producing signals representing the X coordinate, Y coordinate, and Theta orientation of the robot.

Neural networks are ideally suited for recognizing very complex relationships. Their requirements are that there be a functional relationship between the inputs and the outputs, and that they be given enough good training data and time to be able to learn the problem. These conditions are met as proposed.

Due to the nature of neural networks, they tend to ignore the inaccuracies in the signal. As long as the neural network(s) can find a unique combination of information that matches that location, they will learn to identify that defined location with that accumulation of data. If the sonar signal has a variation, this can still be used because that variation will still have a unique average value at each location and the other sensors will have a unique set of inputs also. This combination, along with the unique encoder data and the varying range data, is sufficient for a properly designed network to identify the location.

Rather than rely on inaccurate data and massaging it in the conventional way, this proposed method actually teaches the neural network how to recognize its position using a learning algorithm. The system relies on a series of inputs and makes use of a robust, noise tolerant, massively parallel, computing process to learn the hallway layout.

There has thus been shown and described a novel autonomous navigation apparatus which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Autonomous navigation apparatus for a mobile vehicle arranged to move within an environment that is delimited, at least in part, by a boundary, said apparatus comprising, in combination:

(a) a plurality of sensors arranged on said vehicle and adapted to determine the distance from said vehicle to said boundary, each sensor being operative to determine said distance in a prescribed direction, with respect to said vehicle, which is different from the direction of at least one other sensor;

(b) a neural network comprising an input layer coupled to said sensors, at least one hidden layer coupled to said input layer and an output layer coupled to one of said hidden layers for producing a first output representing an identification of the spacial position of said vehicle; and at least one patch location within said environment for training said neural network to produce a correct first output in response to the distance from said vehicle to said boundary determined by said plurality of sensors and the actual position of said vehicle at the at least one patch location.

2. The apparatus defined in claim 1, wherein the output layer of said neural network further produces a second output representing an identification of the spacial orientation of said vehicle.

3. The apparatus defined in claim 1, wherein said first output represents at least two orthogonal coordinates defining said spacial position.

4. The apparatus defined in claim 3, wherein said first output represents three orthogonal coordinates defining said spacial position.

5. The apparatus defined in claim 3, wherein said first output represents X and Y coordinates of said vehicle.

6. The apparatus defined in claim 1, further comprising means, connected to said input layer, for determining the motion of said vehicle with respect to said boundary.

7. The apparatus defined in claim 1, further comprising:
said mobile vehicle being adapted to move in a forward direction within the environment and having a central vertical axis perpendicular to said forward direction and a central horizontal axis which is parallel to said forward direction and which passes through said vertical axis; and
each of said plurality of sensors being operative to determine said distance in a prescribed angular direction, substantially perpendicular to said vertical axis of said vehicle, which is different from the angular direction of at least one other of the plurality of sensors.

8. The apparatus as defined in claim 7, wherein said neural network produces said first output representing a first spacial coordinate and a second output representing a second spacial coordinate.

9. The apparatus as defined in claim 8, wherein said first and second coordinates are Cartesian coordinates of the position of said vehicle.

10. The apparatus as defined in claim 1, further comprising:
at least one encoder coupled to said input layer of said neural network.

11. The apparatus as defined in claim 1, wherein said neural network comprises:
a first neural network including an input layer coupled to said sensors, a hidden layer coupled to said input layer and an output layer coupled to said hidden layer for producing a first output representing a first identification of the position of said vehicle;
a second neural network including an input layer coupled to said sensors, a hidden layer coupled to said input layer and an output layer coupled to said hidden layer for producing a second output representing a second identification of the position of said vehicle; and
each of said layers in said first and second networks comprise a plurality of network elements and wherein at least two of said layers of said first and second neural networks overlap such that a plurality of said network elements in said two layers are included in both said first and second neural networks.

12. The apparatus defined in claim 11, further comprising:
a third neural network comprising an input layer coupled to said sensors, a hidden layer coupled to said input layer and an output layer coupled to said hidden layer for producing a third output representing a third identification of the position of said vehicle; and
said input layer of said third neural network is coupled to at least one of said first and second outputs.

13. The apparatus defined in claim 12, wherein said first and second identifications are Cartesian coordinates of the said position of said vehicle and said third identification is an angular coordinate.

14. The apparatus defined in claim 12, wherein each of said layers in said first, second and third networks comprise a plurality of network elements and wherein at least two of said layers of at least two of said first, second and third neural networks overlap such that a plurality of said network elements in said two layers are included in more than one of said first, second and third neural networks.

15. Method of calibrating autonomous navigation apparatus for a mobile vehicle arranged to move in a forward direction within an environment that is delimited, at least in part, by a boundary, said vehicle having a central vertical axis perpendicular to said forward direction and a central horizontal axis which is parallel to said forward direction and which passes through said vertical axis, wherein said apparatus comprises, in combination:
(a) a plurality of sensors arranged on said vehicle and adapted to determine the distance from said vehicle to said boundary, each sensor being operative to determine said distance in a prescribed angular direction, perpendicular to said vertical axis of said vehicle, which is different from the angular direction of at least one other sensor;
(b) a first neural network comprising an input layer coupled to said sensors, a hidden layer coupled to said input layer and an output layer coupled to said hidden layer for producing a first output representing a first identification of the position of said vehicle; and
(c) a second neural network comprising an input layer coupled to said sensors, a hidden layer coupled to said input layer and an output layer coupled to said hidden layer for producing a second output representing a second identification of the position of said vehicle;
said calibration method comprising the steps of:
(1) selecting a plurality of patch locations within said environment;
(2) sensing the distances of said vehicle from said boundary using said plurality of sensors while said vehicle is disposed at each of said patch locations;
(3) determining the actual position of said vehicle at each patch location; and
(4) training said neural networks to produce correct first and second outputs in response to the distances sensed in step (2).

16. The method defined in claim 15, further comprising the steps of:
(5) rotating said vehicle about said vertical axis at each of said patch locations; and
(6) carrying out steps (2) through (4) at each angular orientation.

17. A method of calibrating the autonomous navigation apparatus for a mobile vehicle arranged to move in a forward direction within an environment that is delimited, at least in part, by a boundary, said vehicle having a central vertical axis perpendicular to said forward direction and a central horizontal axis which is parallel to said forward direction and which passes through said vertical axis, the method comprising:

arranging a plurality of sensors on said vehicle to determine the distance from said vehicle to said boundary;

positioning a neural network on said vehicle, said neural network including an input layer coupled to said plurality of sensors, a hidden layer coupled to said input layer and an output layer coupled to said hidden layer;

selecting at least one patch location within said environment;

determining the actual position of said vehicle at said at least one patch location;

while said vehicle is at said at least one patch location, determining said distance, for each of said plurality of sensors, from said vehicle to said boundary in a prescribed angular direction substantially perpendicular to said central axis of said vehicle; and training said neural network in response to said sensed distances.

18. The method defined in claim 17, further comprising:

producing a first output from said neural network representing a first identification of the position of the said vehicle within said environment; and producing a second output from said vehicle representing a second identification of the position of said vehicle within said environment.

19. The method defined in claim 17, further comprising:

sensing travel distance of said vehicle moving within said environment; and inputting a signal representative of said sensed travel distance to said neural network.

20. The method defined in claim 17, further comprising:

rotating said mobile vehicle about said vertical axis within said at least one patch location; and determining said distance at different angular orientations of said vehicle within said at least one patch location.

21. The method defined in claim 17, further comprising:

providing a plurality of spaced apart patch locations within said environment; and determining said distance from said vehicle to said boundary at each of said patch locations for training said neural network.

22. The method defined in claim 21, further comprising:

maneuvering said vehicle between said spaced apart patch locations; and training said neural network at each of said plurality of spaced apart patch locations.

\* \* \* \* \*